Dec. 11, 1928.
F. P. PARISH
MACHINE TOOL
Filed Nov. 23, 1927
1,694,560
2 Sheets-Sheet 1
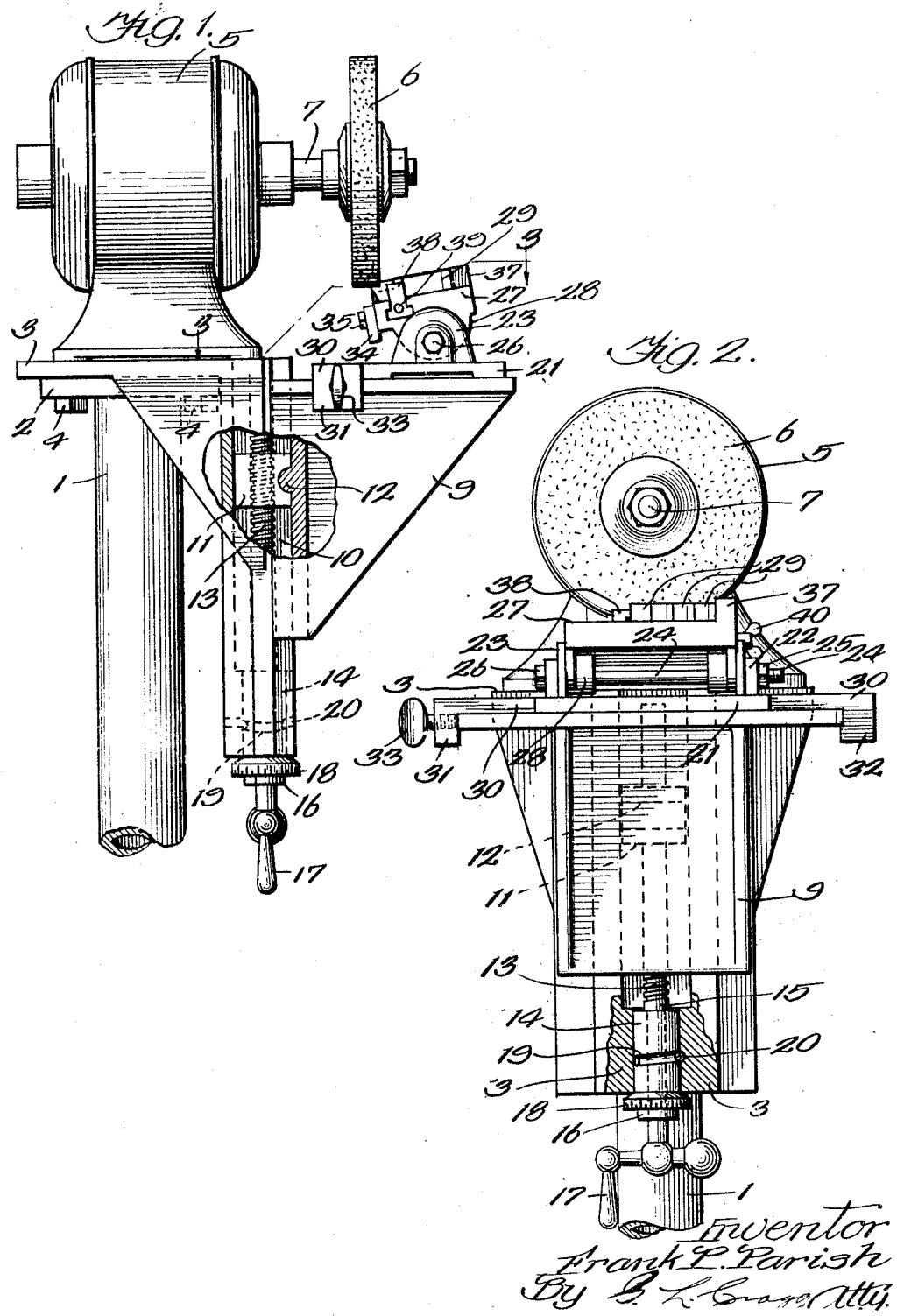

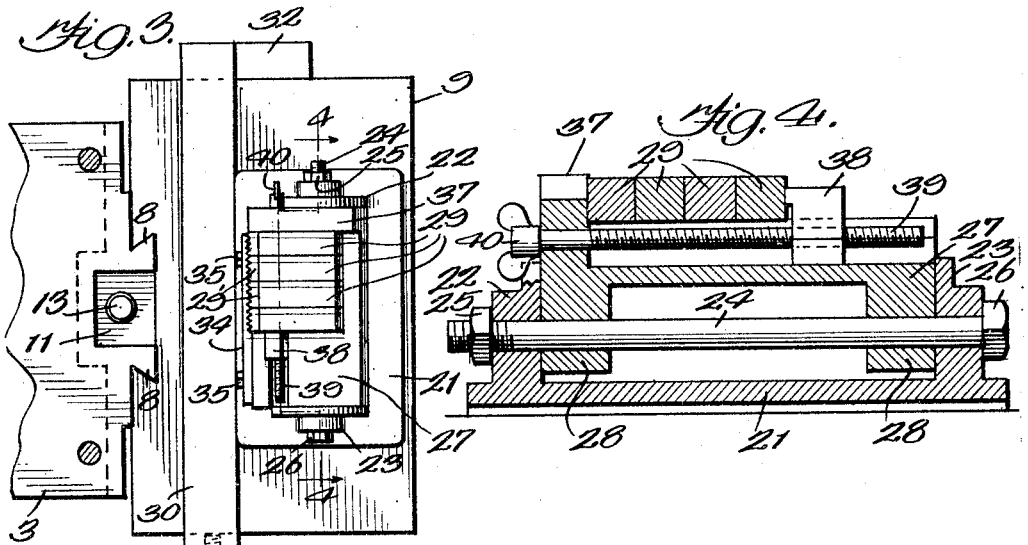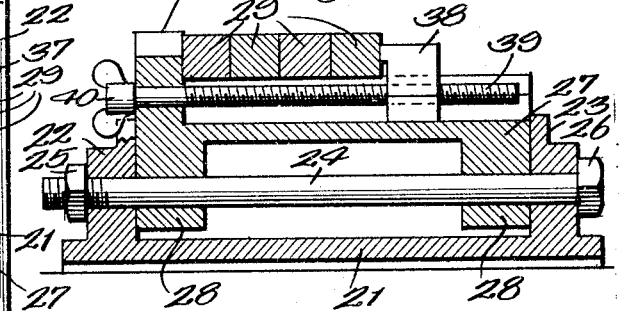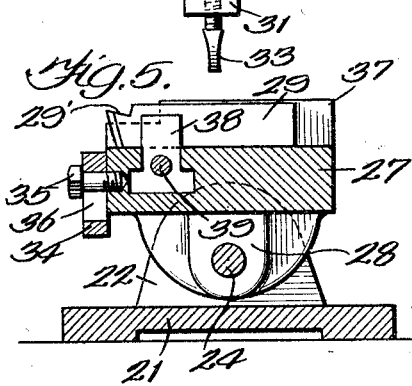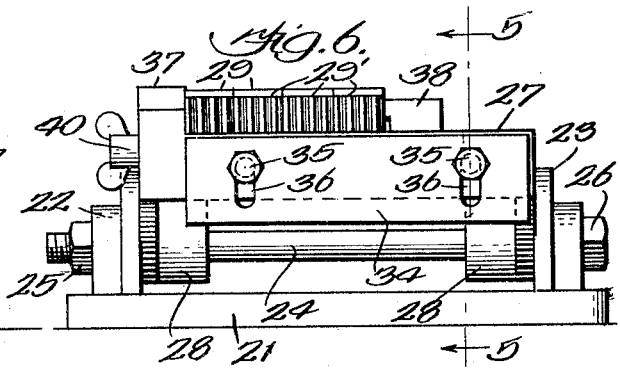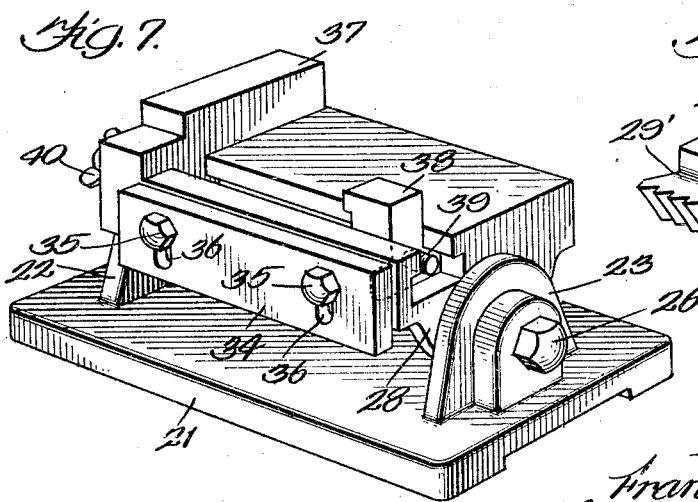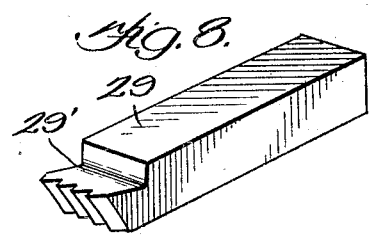

Patented Dec. 11, 1928.

1,694,560

UNITED STATES PATENT OFFICE.

FRANK P. PARISH, OF CHICAGO, ILLINOIS.

MACHINE TOOL.

Application filed November 23, 1927. Serial No. 235,272.

My invention relates to the work holding portions of machine tools that are adapted to effect the removal of material from the work as, for example, by means of grinding emery wheels. The invention resides in the construction of such a work holder and the provision of improved mechanism for adjusting it with respect to the cutting or grinding tool.

In accordance with one characteristic of the invention, the work holder is inclusive of a justifying bar against which the parts of the work, such as the noses of cutting tools, which are to be ground, are placed, the justifying bar being placed in another position after the work has been clamped in order to afford access of the tool to the work.

In accordance with another feature of the invention, a feeding screw is assembled with the work holder in a manner to bring the work holder nearly into the desired position, the screw having a bearing sleeve which is adapted for micrometric adjustment with respect to the support that carries it, the screw and bearing sleeve being not adapted for relative longitudinal movement so that the screw moves with the bearing sleeve longitudinally of the common axis of the bearing sleeve and screw when the bearing sleeve is micrometrically adjusted whereby the work holder is brought to its predetermined position with extreme accuracy.

In accordance with another feature of the invention, the angularity of the work holder is variable with respect to the cutting or grinding tool, a feature of importance when the invention is embodied in a grinding machine that is employed for sharpening lathe tools.

The invention will be more fully explained in connection with the accompanying drawings in which Fig. 1 is a side view with parts broken away; Fig. 2 is a front view of a machine; Fig. 3 is a sectional view, on line 3—3 of Fig. 1; Fig. 4 is a sectional view on line 4—4 of Fig 2; Fig. 5 is a sectional view on line 5—5 of Fig. 6; Fig. 6 is a view looking toward the inner side of the work holder, the side that is adjacent the cutting tool; Fig. 7 is a perspective view of the work holder; and Fig. 8 is a perspective view of one form of tool which may be sharpened in the machine.

The invention illustrated includes a pedestal or standard 1 having a square flange 2 at its upper end to which the angular body or support 3 is secured by means of bolts 4. An electric motor 5 is suitably mounted upon the support 3, an abrasive grinding wheel 6 of emery or other suitable material being illustrated upon the horizontal shaft 7 of the motor. The support 3 is inclusive of upright dovetailed rib formations 8 constituting a guide for the work supporting bed 9 which has dovetailed engagement therewith. Said support also has an upright groove 10 between the ribs 8 in which a block 11 is slidingly received. A feather 12 upon the inner and upright side of the work supporting bed 9 is received in a recess in the block 11 so that both bed and block are movable vertically together. An upright threaded shaft or feeding screw 13 is received in the groove 10 and passes through the block 11 with which the shaft is in threaded connection. The groove 10 is U-shaped and the block 11 is correspondingly rectangular to prevent the block from turning. The screw is provided with a bearing sleeve 14 which, in turn, has bearing in the lower end of the support 3, said sleeve and support being normally relatively fixed, however. The screw 13 is formed with shoulders 15 and 16 between which the sleeve is snugly received to eliminate movement of the sleeve and screw longitudinally of their common axis. A handle 17 is secured upon the lower end of the screw or shaft 13 whereby the screw may readily be turned to move the block 11 up or down to bring the work supporting bed approximately to the position it is to occupy. The lower end of the sleeve 14 is enlarged into a flange 18 having micrometric scale marks thereon, there being suitable complemental marking upon the screw shoulder 16. An inclined cam groove 19 is formed in the exterior of the sleeve 14, a pin 20, which is carried by and fixed with relation to the lower end of the support 3, being received in this cam groove. After the work supporting bed 9 has been approximately brought into position by turning the handle 17, the bearing sleeve 14 is carefully turned to bring the bed accurately to its final position.

I will now describe the work holder which is adjustably supported upon the bed 9. This work holder includes a base plate 21 which rests upon the horizontal and top portion of the support 9. This base plate carries two upright bearings 22 and 23, these bearings and base plate being preferably of integral formation. A shaft 24 is supported by the bearings 22, 23, this shaft being preferably in the form of a bolt which is held stationary by means of the clamping nut 25 threaded upon one end of the bolt and which serves, when turned against the bearing 22, to clamp the bolt head 26 against the bearing 23. The work holder proper is inclusive of a cradle 27 having depending sides 28 through which the shaft 24 passes. The cradle sides 28 are snugly fitted between the bearings 22 and 23 and when the nut 25 is tightened, said bearings are clamped against the cradle sides to hold the cradle from turning. By this arrangement the angle of the tools 29 or other work which is to be operated upon with reference to the cutter or grinder 6 is regulable. The extent to which the work may be advanced toward the wheel 6 is determined by the stop bar 30 which overhangs the bed 9 and has end portions 31, 32 which drop below the level of the bed, Fig. 2. A thumb screw 33 passes through the portion 31 into engagement with the bed 9 so that the position of the stop 30 may be fixed. The base plate that carries the cradle 27 is desirably moved toward the stop bar 30 by hand, the action of the tool 6 on the work 29 being thus regulable by hand.

Where the work to be operated upon is a collection of tools of the nature generally illustrated in Fig. 8 and which, to be sharpened, require their upper and sloping surfaces 29' to be ground, I provide a justifying bar 34 which is assembled with the cradle by means of bolts 35 which are screwed into one of the cradle sides and whose stems pass through slots 36 in said justifying bar. It is important that the cutting ends of the noses of all of the tools should be placed in exact alignment and parallel with the plane of the wheel 6 so that the wheel may have similar action upon all the tools 29 at their surfaces 29', the cradle 27 being turned to exactly the right position to enable the peripheral face of the wheel 6 to have proper contact with said surfaces. To this end the justifying bar 34 which is parallel with the plane of the wheel 6 is raised to be engageable by the cutting ends of the noses of the tools 29, the justifying bar being clamped in this parallel position to insure the exact alignment of said cutting noses and the parallelism of this alignment with the plane of said wheel. After the tools 29 have been properly positioned with respect to said wheel, they are clamped against the abutment 37 which rises above the bed of the cradle, the clamping means illustrated being inclusive of a clamping jaw 38 opposite the abutment 37 and a clamping bolt 39 which is in threaded engagement with the jaw 38 and whose head 40 engages the outer surface of said abutment whereby the tools 29 may be clamped in place when said clamping bolt is turned. The justifying bar 34 is now dropped out of the path of the wheel 6, the bolts 35 being loosened for this purpose. The tools 29 illustrated are threaded cutting tools, though it is obvious that the machine illustrated is not to be limited to the character of work which may be operated upon thereby.

Changes may be made without departing from the invention.

Having thus described my invention, I claim:

A work support in combination with a screw for adjusting the position of the work support; a block having threaded engagement with the screw and non-rotative engagement with the work support; a bearing sleeve for the screw, said sleeve and screw having interengagement preventing their relative movement longitudinally of their common axis; and a support for said bearing sleeve and in which said sleeve may be turned and with which said sleeve has cam connection enabling said sleeve and screw to be moved simultaneously along their common axis.

In witness whereof, I hereunto subscribe my name.

FRANK P. PARISH.